United States Patent [19]  [11] 4,358,926
Smith  [45] Nov. 16, 1982

[54] TURBINE ENGINE WITH SHROUD COOLING MEANS

[75] Inventor: Raymond Smith, Monclova, Ohio

[73] Assignee: Teledyne Industries, Inc., Los Angeles, Calif.

[21] Appl. No.: 173,832

[22] Filed: Jul. 30, 1980

Related U.S. Application Data

[63] Continuation of Ser. No. 939,886, Sep. 5, 1978, abandoned.

[51] Int. Cl.³ .............................................. F02C 7/12
[52] U.S. Cl. ................................... 60/39.83; 415/115
[58] Field of Search .................... 60/39.36, 39.83; 415/115, 116, 117, 178

[56] References Cited

U.S. PATENT DOCUMENTS

| | | | |
|---|---|---|---|
| 2,625,013 | 1/1953 | Howard et al. | 415/116 |
| 2,787,440 | 4/1957 | Thompson | 415/115 |
| 3,575,528 | 4/1971 | Beam | 415/12 |
| 3,903,691 | 9/1975 | Szydlowski | 60/39.75 |
| 4,017,207 | 4/1977 | Bell et al. | 415/115 |

Primary Examiner—Louis J. Casaregola
Attorney, Agent, or Firm—Gifford, VanOphem, Sheridan & Sprinkle

[57] ABSTRACT

A turbine engine construction is provided with novel shroud cooling means. The turbine engine includes a compressor having its outlet open to a combustion chamber into which fuel is also introduced. The hot expanding gases resulting from the combustion of the fuel within the combustion chamber exhaust through a plurality of circumferentially spaced and relatively stationary stator vanes and through one or more turbine stages to rotatably drive the same. A portion of the outlet gases from the compressor, however, are diverted from the combustion chamber and impinge upon an annular shroud secured to the support housing around each turbine stage in order to cool the shroud and minimize its thermal expansion. From the shroud, the cooling air flow passes through a fluid passageway formed through one or more stator vanes and is returned to the combustion chamber.

7 Claims, 2 Drawing Figures

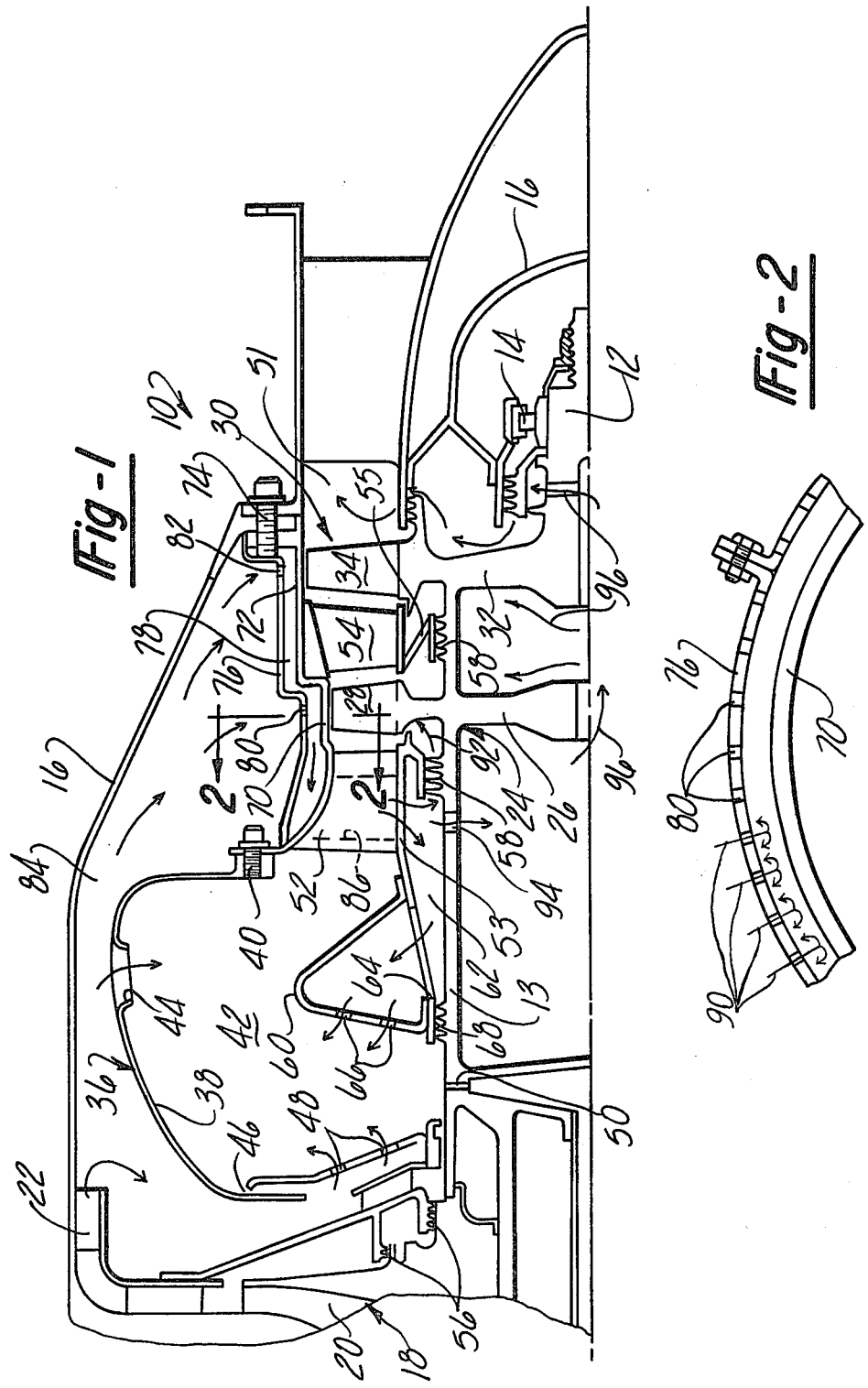

TURBINE ENGINE WITH SHROUD COOLING MEANS

CROSS REFERENCE TO RELATED APPLICATIONS

This is a continuation of application Ser. No. 939,886, filed Sept. 5, 1978, abandoned.

BACKGROUND OF THE INVENTION

I. Field of the Invention

The present invention relates generally to turbine engines and, more particularly, to a means for cooling the shroud assembly in such turbine engines.

II. Description of the Prior Art

Historically, improvements in turbine engine performance have been heretofore achieved by increases in the gas temperature at the tubular inlet. Current projections anticipate a continuing increase in the operating temperatures for the turbine while maintaining or even improving component efficiencies and the overall efficiency of the engine.

High turbine engine efficiency requires a minimization of the turbine rotor tip clearance, i.e. the clearance between the outer radial ends of the turbine blades and the shroud assembly. Due to the thermal expansion of the turbine disc, the turbine blades and the shroud, turbine rotor tip clearance control and minimization becomes increasingly difficult as the turbine inlet temperatures increase.

With the previously known turbine engines, the rotor tip clearance is preset to a predetermined value, for example, 0.05 inches for a 6.3 inch radius turbine rotor when the engine, and consequently the engine components, are cold. During rapid engine start and acceleration, both the engine shroud and turbine blades rapidly reach their operating temperatures and, as a result, thermally expand. The thermal expansion of the shroud, however, exceeds that of the turbine blades so that the rotor clearance increases to, for example, 0.12 inches in the given example at engine startup.

As the turbine engine reaches steady state operation, the disc in addition to the shroud and blades also reaches its operating temperature thus reducing the rotor tip clearance to about 0.06 inches for the given example. This relatively wide rotor tip clearance at the steady state operating condition for the turbine engine substantially adversely affects the overall turbine engine efficiency.

During a throttle chop, i.e. when the turbine engine is rapidly shut down, both the shroud and turbine blades rapidly cool and thus thermally contract. The turbine disc, however, retains its heat for a relatively longer period of time and thus remains thermally expanded in the given example. It is this thermal expansion of the disc which establishes the assembly tip clearance requirement in order to prevent siezure of the turbine during engine shut down.

There are a number of previously known techniques designed to reduce the rotor tip clearance, and thereby increase engine efficiency, during operation of the turbine engine. These previously known techniques include directing high pressure cooling air, typically from the compressor outlet, across the outer periphery of the shroud in order to cool and thus minimize thermal expansion of the shroud. After the cooling air flow impinges upon the shroud, the then somewhat heated air has been heretofore exhausted through openings in the shroud or between the shroud and support housing and to the exhaust stream and expelled from the turbine engine.

This previously known method for cooling the shroud, however, is disadvantageous in that a significant portion of compressor output is required to cool the shroud and this cooling air undergoes a substantial degradation of pressure without producing any useful work output for the turbine engine. Consequently, these previously known shroud cooling methods adversely decrease the overall turbine engine efficiency and likewise increase the engine fuel consumption.

SUMMARY OF THE PRESENT INVENTION

The present invention overcomes these disadvantages by providing an air cooled shroud assembly but in which the cooling air is returned to the combustion chamber of the combustor rather than wastefully expelled into the exhaust stream.

In brief, the major components of the turbine engine are of conventional construction and include an air compressor having its outlet open to the combustion chamber of a combustor. The outlet from the combustion chamber, in turn, is open via a nozzle, typically comprising a plurality of circumferentially spaced stator vanes, to at least one and quite often more turbine wheels. The turbine wheels are connected to a main shsaft which, in turn, is rotatably journalled in the support housing for the turbine engine.

A portion of the compressor outlet air is diverted from the combustion chamber and to an annular chamber formed between the outer periphery of an annular shroud and an annular closure wall spaced radially outwardly from the shroud. The impingement of the compressor air on the outer periphery of the shroud cools the same and thus minimizes both the thermal expansion of the shroud and the turbine rotor tip clearance.

Unlike the previously known air cooled shrouds, however, the still pressurized and somewhat heated air in the annular chamber flows through radial fluid passageways formed through the hollow stator vanes to an axial and annular passage between the turbine main shaft and the support housing and to the combustion chamber. Since the combustion chamber is pressurized from the compressor outlet air, the pressure degradation of the cooling air flow is minimized thereby increasing engine efficiency. Moreover, since the cooling air flow is returned to the combustion chamber for combustion with the fuel, the turbine engine construction of the present invention enjoys a lower fuel consumption than the previously known engines in which the cooling air flow on the shroud is exhausted into the exhaust stream from the turbine engine.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a longitudinal fragmentary sectional view illustrating the turbine engine construction according to the present invention; and FIG. 2 is a fragmentary sectional view taken substantially along line 2—2 in FIG. 1 and enlarged and with parts removed for clarity.

DETAILED DESCRIPTION OF THE PRESENT INVENTION

With reference first to FIG. 1, a turbine engine 10 according to the present invention is thereshown and comprises a main shaft 12 connected to a shaft extension 13 and rotatably mounted by bearings 14 in a support housing 16. An air compressor 18 having an outlet impeller 20 is secured to the shaft extension 13 for rotation therewith and supplies pressurized air to its outlet 22 in the conventional fashion. At the opposite end of the shaft 12 at least one, and preferably two, turbine stages 24 and 30, each having a disc 26 and 32 and a turbine blade 28 and 34, respectively, are likewise secured to the main shaft 12 and rotate in unison therewith.

A combustor 36 is disposed between the air compressor 18 and the first turbine stage 24 and includes an outer annular shell 38 secured to the support housing 16 by appropriate means 40 which defines an annular combustion chamber 42. Pressurized air from the compressor outlet 22 enters the combustion chamber 42 through openings 44, 46 and 48 while fuel is injected radially outwardly into the combustion chamber 42 via a plurality of circumferentially spaced fuel nozzles 50 (only one of which is shown). Upon combustion of the fuel in the combustion chamber 42, the hot and expanding gases exhaust through an exhaust passageway 51 and thus past the turbine blades 28 and 34 of the turbine stages 24 and 30. In addition, a plurality of circumferentially spaced first stator vanes 52 are secured to the support housing 16 between the first turbine stage 24 and the combustion chamber 42 and form a nozzle to direct the fluid flow into the first turbine stage 24. Similarly, a plurality of circumferentially spaced second stator vanes 54 are secured to the support housing 16 between the first and second turbine stages 24 and 30 to direct the fluid flow into the second turbine stage 30.

Suitable labyrinth seals are provided between the rotating and nonrotating components of the turbine engine 10. In particular, seals 56 are provided between the support housing 16 and the back face of the final compressor stage 20 in order to isolate the relatively cool compressor 18 from the hot portions of the turbine engine 10. Similarly, labyrinth seals 58 are provided between the inner rim of each stator 52 and 54, respectively, and the shaft extension 13.

A hollow annulus 60 having a generally triangular cross-sectional shape is connected to the support housing 16 via the rim 53 of the first stator blades 52 and is positioned within and about the inner periphery of the combustion chamber 42 and adjacent the fuel nozzle 50. Moreover, the rim 53 is spaced radially outwardly from the shaft extension 13 thus defining an axial and annular fluid passageway 62 between the rim 53 and shaft extension 13. This passageway 62 is open to the combustion chamber 42 via openings 64 and 66 formed through the annulus 60. A labyrinth seal 68 fluidly seals the forwardmost portion of the annulus 60 to the shaft extension 13.

With reference now to FIGS. 1 and 2, a first and second annular shroud 70 and 72, respectively, are secured to the support housing 16 by conventional means 74 and 40 around the turbine stages 26 and 30 so that the shrouds 70 and 72 are spaced radially outwardly from the turbine blades 28 and 34. The shrouds 70 and 72 can be of one piece construction and it is the space between the inner periphery of the shroud 70 and 72 and the outer tips of the turbine blades 28 and 34 which forms the rotor tip clearance. It is the minimization of the rotor tip clearance, while avoiding actual contact or rubbing between the turbine blades 28 and 34 with their respective shrouds 70 and 72, which increases the overall turbine efficiency.

An annular wall 76 is secured to the support housing 16 coaxially around and spaced radially outwardly from the shrouds 70 and 72 thus forming a narrow annular chamber 78 between the shrouds 70 and 72 and the annular wall 76. A plurality of circumferentially spaced apertures 80 are formed through the annular wall 76 at a position radially outwardly from the first turbine stage 26 while similarly a second set of circumferentially spaced apertures 82 are formed through the annular wall 76 at a position radially outwardly from the second turbine stage 30. These apertures 80 and 82 provide fluid communication from the outlet 22 of the air compressor 18 and to the annular chamber 78 via a fluid passageway 84 between the support housing 16 and the combustion chamber housing 38. A radially extending fluid passageway 86 through the first stator vanes 52 similarly establishes fluid communication between the annular chamber 78 and the combustion chamber 42 via the axially extending chamber 62.

The component parts of the turbine engine 10 of the present invention having been described, its operation is as follows:

During engine operation the majority of the compressed air exhausting from the air compressor outlet 22 enters the combustion chamber 42 directly via passageways 44, 46 and 48. A portion of the compressed air from the compressor outlet 22, however, is diverted through passageway 84 and into the annular chamber 78 through the apertures 82 and 80. The apertures 80 and 82, of course, provide a fluid restriction so that the portion of compressed air diverted to the passageway 84 can be controlled both by the size and number of the apertures 80 and 82 in cooperation with the size and number of passages 66.

As the compressed air flows through the apertures 80 and 82, the air impinges upon the outer periphery of the shrouds 70 and 72, as depicted by arrows 90 (FIG. 2) and thus cools the shrouds 70 and 72 to thereby minimize the shroud thermal expansion and the rotor tip clearance. Since the apertures 80 and 82 are positioned in the same axial plane as the first and second turbine stages 24 and 30, respectively, the maximum cooling of the shrouds 70 and 72 occurs at their most critical axial position, i.e. radially outwardly from the tips of the turbine blades 28 and 34.

From the annular passageway 78, the compressed air flows through the stator vane passageway 86 to the annular passageway 62 and from the passageway 62 to the combustion chamber 42 via the openings 64 and 66 in the annulus 60.

The return of the compressed air used to cool the shrouds 70 and 72 to the combustion chamber 42 is advantageous in several different respects. First, since the combustion chamber 42 is pressurized, only a slight degradation of pressure of the cooling air flow across the shrouds 70 and 72 prior to its introduction into the combustion chamber 42 occurs. This relatively small pressure drop in turn minimizes the lost work from the compressor output, unlike the previously known turbine engines with air cooled shrouds. Moreover, since the cooling air is returned to the combustion chamber 42 rather than simply exhausted into the turbine outlet stream, a decrease in fuel consumption for work output also occurs.

The return of the cooling air flow through the openings 66 in the annulus 60 is also advantageous in that the cooling air flow is injected crosswise of the fuel injection into the combustion chamber 42. Consequently, the cooling air flow increases and enhances mixing of the fuel which results in better and more efficient combustion of the fuel within the chamber 42. The increased efficiency of the fuel combustion also decreases the fuel consumption of the turbine engine 10.

In practice, however, a small portion of the pressurized air within the annular chamber 62 will leak past the seal 58, as depicted by the arrow 92, and impinge on the disc 26 of the first turbine stage 24 and thereafter exhaust into the turbine exhaust stream. This leakage, however, advantageously provides cooling for the turbine disc 26. Moreover, if desired, a further leakage opening 94 can be provided through the shaft extension 13 which is open to the annular chamber 62. Compressed air flow through the opening 94 flows, as shown by arrows 96, along the shaft 12 and radially outwardly along both sides of both turbine discs 26 and 32 and thus cools the turbine discs 26 and 32. Thereafter, this air flow is exhausted into the exhaust stream for the turbine engine. It will be understood, however, that the cooling air flow along the turbine discs 26 and 32 is very minor when compared to the cooling air flow returned to the combustion chamber 42.

From the foregoing it can be seen that the turbine engine construction 10 according to the present invention provides a novel shroud cooling means which is not only effective in operation but which also increases the engine efficiency and decreases fuel consumption.

Having described my invention, however, many modifications thereto will become apparent to those skilled in the art to which it pertains without deviation from the spirit of the invention as defined by the scope of the appended claims.

I claim:

1. In a turbine engine of the type having a support housing, an air compressor rotatably mounted in said housing and having an inlet and an outlet, a combustor in said housing, said combustor having a chamber fluidly connected with the outlet from the compressor, means for supplying fuel to said combustor chamber, at least one turbine wheel rotatably mounted to said support housing and at least one stator vane connected to said support housing, and an annular shroud attached to said housing coaxially around said turbine wheel, the improvement which comprises:

an annular wall secured to said support housing coaxially around and spaced radially outwardly from said shroud and forming an annular chamber therebetween, first fluid passage means in said support housing between said compressor outlet and the outer periphery of said annular wall for diverting a portion of said compressor output to said outer periphery of said annular wall, said annular wall having a plurality of openings which provide fluid communication from said compressor outlet and to said annular chamber so that air flow through said openings impinges against said outer periphery of said shroud, and wherein each of said openings is in radial alignment with one of said at least one turbine wheel so that the entire diverted portion of said compressor output flows through said openings and into said openings and into said annular chambers, said at least one stator vane having a fluid passageway formed therethrough, said fluid passageway having a portion adjacent the upstream edge of said stator vane, said fluid passageway being open at one end only to one end of said annular chamber so that all of said diverted portion of the compressor output flows into said annular chamber, against said shroud and thereafter flows through said vane fluid passageway to thereby cool said vane; and second fluid passage means for fluidly connecting the other end of said vane fluid passageway and said combustor chamber and for returning a major portion of said diverted portion of said compressor output to said combustor chamber.

2. The invention as defined in claim 1 wherein said opening further comprises a plurality of circumferentially spaced apertures in said annular wall, said apertures being positioned in substantially the same radial plane as said at least one turbine wheel.

3. The invention as defined in claim 1 wherein said second fluid passage means further comprises an annular rim secured to the inner periphery of said stator vane, said rim extending axially toward said combustor chamber and spaced radially outwardly from a rotating hub and thereby forming a second annular chamber open at the end most spaced from the stator vane to the combustion chamber.

4. The invention as defined in claim 3 and further including an annulus secured to said rim within said combustor chamber, said annulus having fluid passage means formed therethrough for establishing fluid communication from said second annular chamber and to said combustor chamber.

5. The invention as defined in claim 2 wherein said turbine engine includes two turbine wheels and wherein said opening further comprises a plurality of first circumferentially spaced apertures and a plurality of second circumferentially spaced apertures, said first apertures being in the same radial plane as one turbine wheel and said second apertures being in the same radial plane as the other turbine wheel.

6. The invention as defined in claim 3 and further comprising third fluid passage means for diverting a portion of the air flow through said second annular chamber to and along said turbine wheel to thereby cool the same.

7. The invention as defined in claim 4 wherein said annulus fluid passage means further comprises at least one aperture formed through said annulus whereby air flow through said annulus aperture is projected in a first direction into said combustor chamber, said fuel supplying means being adapted to project fuel into said combustion chamber in a second direction, said first and second directions being cross wise with respect to each other whereby air flow through said annulus enhances fuel mixing within said combustion chamber.

* * * * *

UNITED STATES PATENT OFFICE
CERTIFICATE OF CORRECTION

Patent No. 4,358,926　　　　　　　　Dated November 16, 1982

Inventor(s) Raymond Smith

It is certified that error appears in the above-identified patent and that said Letters Patent are hereby corrected as shown below:

Column 2, line 29, "shsaft" should be --shaft--.

*Signed and Sealed this*

*Twenty-second* Day of *February 1983*

[SEAL]

Attest:

GERALD J. MOSSINGHOFF

*Attesting Officer*　　*Commissioner of Patents and Trademarks*